United States Patent [19]

Keller, Jr.

[11] 4,121,686
[45] Oct. 24, 1978

[54] HOLLOW SOUND-DAMPENED STRUCTURE

[76] Inventor: Moreau A. Keller, Jr., Rte. 1, Box 242, Milton, Del. 19968

[21] Appl. No.: 805,012

[22] Filed: Jun. 9, 1977

[51] Int. Cl.² .............................................. F01N 1/24
[52] U.S. Cl. .................................. 181/233; 181/252; 181/296
[58] Field of Search .............................. 181/233–234, 181/252, 296

[56] References Cited

U.S. PATENT DOCUMENTS

| | | | |
|---|---|---|---|
| 2,495,693 | 1/1950 | Byrd | 181/233 X |
| 2,756,172 | 7/1956 | Kidd | 181/233 X |
| 3,233,699 | 2/1966 | Plummer | 181/252 X |

*Primary Examiner*—Donald G. Kelly
*Attorney, Agent, or Firm*—Donald D. Denton

[57] ABSTRACT

This invention covers a hollow, sound-dampened structure capable of reducing propagation of high frequency sound waves, in which a hollow, walled structure is covered with sound-transmission barrier material and an outer wrapping of a thin flexible plastic material capable of maintaining the sound-transmission barrier material adjacent to the outer surface of the structure.

17 Claims, 6 Drawing Figures

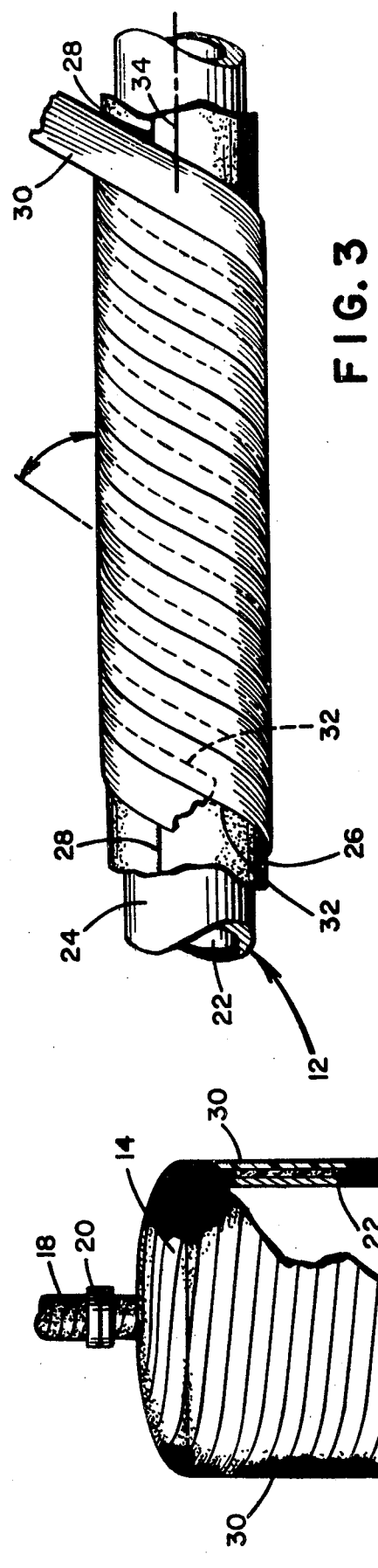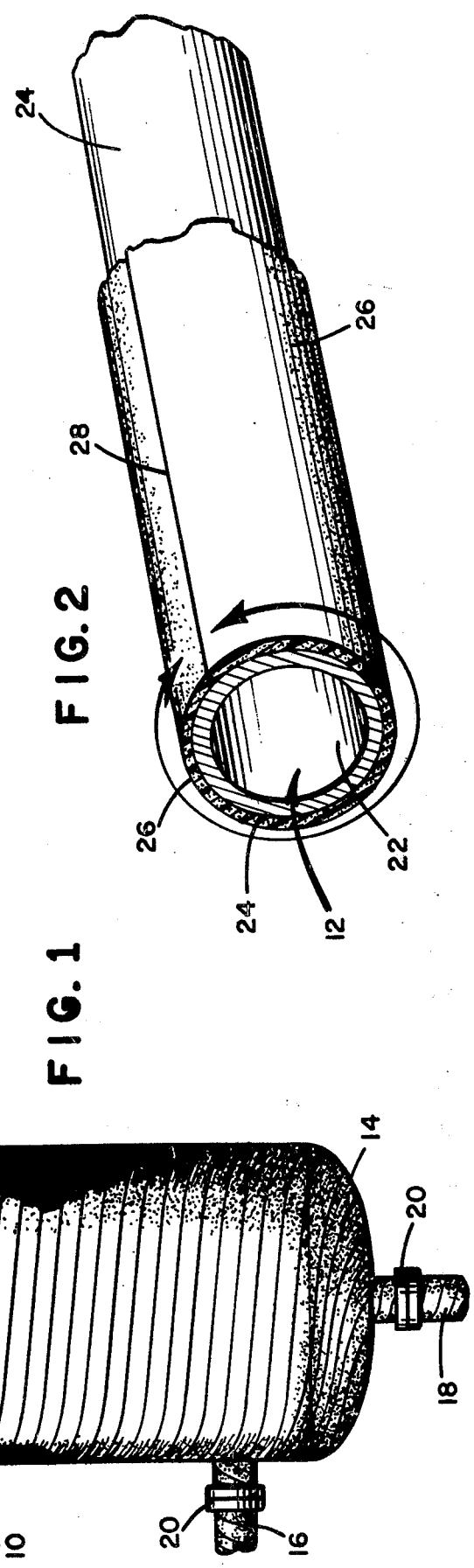

HOLLOW SOUND-DAMPENED STRUCTURE

BACKGROUND OF THE INVENTION

This invention relates to fluid handling structures such as conduits, vessels, and the like, in which fluent materials are moved or conveyed at high velocities so that high frequency sound waves are generated through the wall of the structure.

In commercial plants, for example, the conveying and processing of material under certain conditions are accomplished by high velocity flow. Under such conditions, particularly when thin walled tubing or structures are used, this high velocity flow of material produces sound waves of high frequency which reverberate from the walled structure through which it is flowing. Such high frequency sound waves produce sharp and irritating noise which is objectionable and which in many cases must be deadened. This is particularly true of sound waves having frequencies in about the 500 Hz range or above.

In U.S. Pat. No. 2,089,492, Lambert recognizes the necessity for reducing sound in air conditioning ducts to remove objectionable noise. The patentee teaches the use of laminated ducts having several layers of sound absorbing material which provide for the reduction of sound propagation as air is conveyed under a pressure head through the ducts. Such sound absorbing materials are good for reducing noise of low frequency; therefore, they are satisfactory for air conveyance under relatively low velocities. The problem in high velocity fluid handling, such as where particulate materials are flowing in a fluid-like manner under a high head of pressure and in many cases in thin walled tubing, sound waves that are produced by the wall of the structure reach frequencies as high or higher than 500 Hz. Such high frequencies produce noise conditions that are above the desirable levels for effective working environment.

SUMMARY OF THE INVENTION

In order to dampen high frequency sound waves so that noise is reduced to a level that is tolerable and not annoying to personnel within the vicinity of the noise, this invention contemplates sound dampening hollow structures by covering the outer wall of the structure with a sound-transmission barrier having a high density, i.e. high weight per sq. ft., that is capable of reducing high frequency sound waves to a low frequency, and providing an overwrapping of a thin flexible plastic film so as to maintain the barrier material adjacent to the outer surface of the structure so that a composite structure is formed that will effectively dampen the high frequency sound waves that are produced in the hollow walled structure.

Advantageously, an additional layer or layers of sound absorbent material such as fiberglass, asbestos, foamed plastic, and the like, that is capable of additionally contributing to the total effectiveness of sound dampening, may be included in the total wrapped structure. The sound absorbent material, which of course will be a low-density material, can be positioned under the final overwrapping of thin flexible plastic material, that is, either over or under the sound-transmission barrier material so as to enhance the functioning of the sound-transmission barrier material in the dampening of sound waves produced by high velocity flow through the structure.

It will be appreciated that the final wrapping of thin flexible plastic film produces a cover that can be cleaned easily and, when it is formed from a tough, heat-shrinkable film such as "TEDLAR" (polyvinyl fluoride), there is provided an added feature of a tough outer covering that withstands abrasion, mechanical abuse, and weathering. The heat-shrinkable plastic film also produces a tight covering since materials transported under high velocity conditions produce frictional heat in the wall of the structure thus aiding the outer heat-shrinkable plastic wrapping to encase more tightly the total sound-dampened structure. It will be appreciated that, under these circumstances, there is produced a unified sound transmission barrier that is capable of substantially reducing high frequency sound waves to frequencies that are within a tolerable and acceptable range.

BRIEF DESCRIPTION OF THE DRAWINGS

These and other objects will become apparent from the following description of preferred embodiments and the drawings, in which:

FIG. 1 is a vertical view of a hollow structure in the form of a vessel having communicating conduits, and a cutaway portion of the vessel showing an outer thin flexible plastic wrapping and a sound-transmission barrier covering adjacent to the walls of the vessel;

FIG. 2 is a partial side view in perspective showing a sheet of sound-transmission barrier material with an abutting joint covering a hollow conduit structure;

FIG. 3 is a partial side view of the hollow conduit structure covered with a sheet of sound-transmission barrier material shown in FIG. 2 having an outer spiral wrapping of a thin flexible plastic tape with edges overlapped;

DESCRIPTION OF THE PREFERRED EMBODIMENTS

Figure 6:
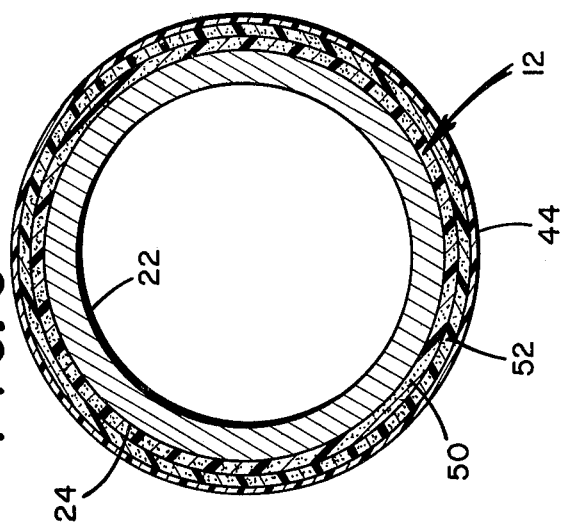
FIG. 6 is an end view of still another embodiment of a hollow conduit structure showing a first layer of a low density sound absorption material, a second layer of a high density sound-transmission barrier material, and a third layer of a thin flexible plastic outer wrapping.

The hollow sound-dampened structure is illustrated in FIG. 1 as numeral 10. The structure has a body portion 12, end insulated sections 14, and outlet and inlet conduits 16 and 18, respectively, connected to the body portion 12 by flange connections 20. Body section 12 and conduits 16 and 18 each has an inner and outer wall 22 and 24, respectively, the outer wall having a covering of a high density sound-transmission barrier material 26 that is of sufficient density to dampen the transmission of high frequency sound waves produced when high velocity fluid or fluid-like material is passed through the hollow structure.

The sound-transmission barrier material 26 can be applied in cut sheet form, with the width of the sheet equal to the outside diameter of the body portion 12 and of a length that is convenient to handle. When the sheet is wrapped about the body portion, the opposite edges of the width of the sheet provide a butt joint 28 so that the body portion is completely encircled. The butt joint 28 can be adhesive sealed along the line forming the joint to maintain the sound-transmission barrier material in place. The length or run of the hollow structure can thus be covered by encircling one section after another as is shown in FIG. 2.

Positioned over the sound-transmission barrier material 26 is a spiral wrapping of thin flexible plastic tape 30 with adjacent edges 32 of the tape in an overlapped relationship. The thin flexible plastic tape 30 is wound on a spiral, the edges of the tape making about a 30° angle with the running axis 34 of the structure. It will be appreciated that the plastic tape 30 can be spirally wound at angles other than 30°. A strong unified outer covering is produced that maintains the high density sound-transmission barrier material adjacent to the body 12 of the structure providing for reduction of the frequency of any high frequency sound waves produced (see FIG. 3).

Figure 5:
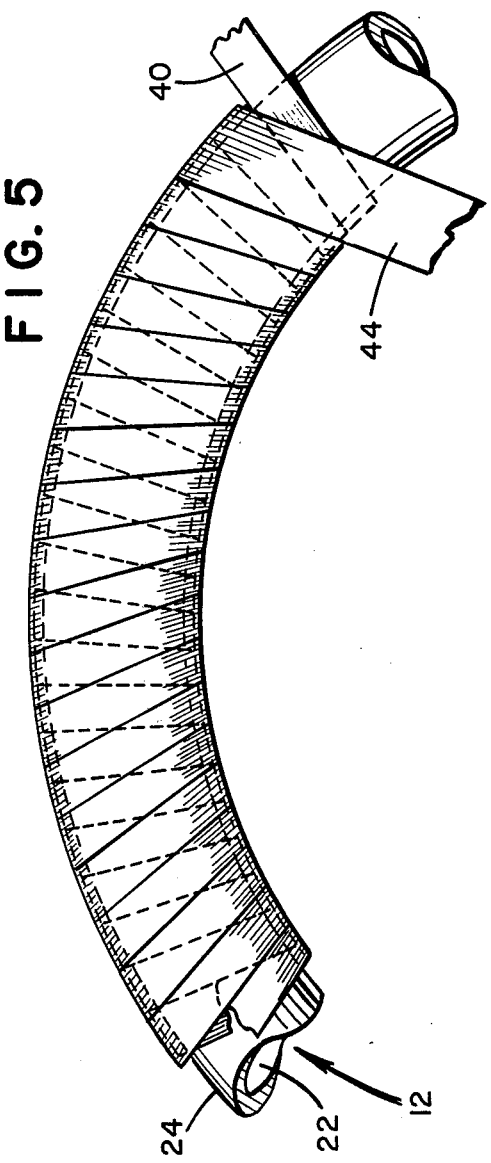
FIG. 5 is a partial side view of the hollow conduit structure of FIG. 4 showing an outer spiral wrapping of a thin flexible plastic tape with overlapped edges.
Figure 4:
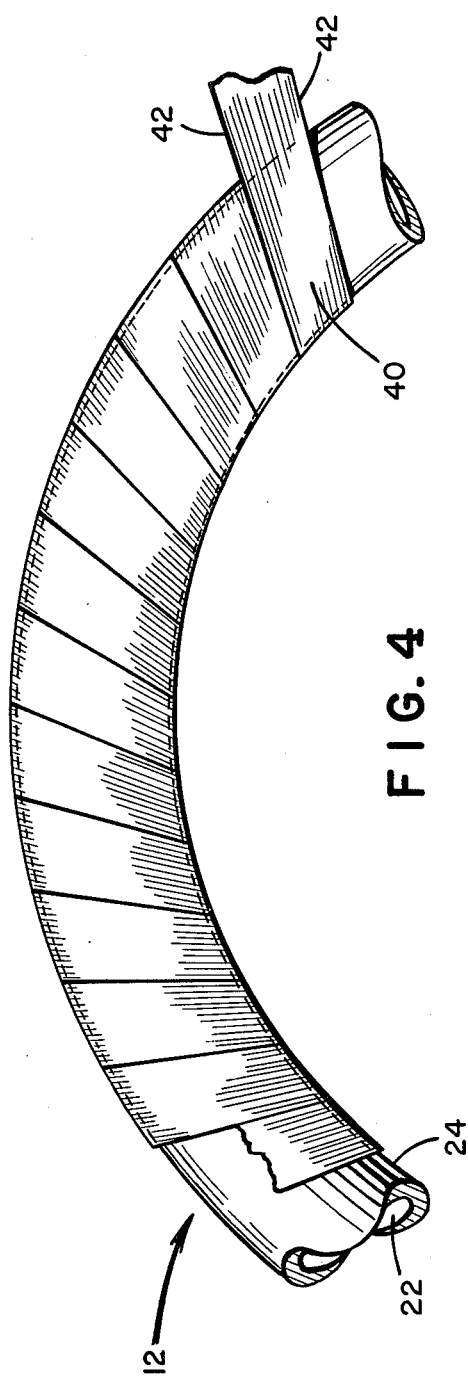
FIG. 4 is a partial side view of another embodiment of this invention showing a hollow curved conduit structure spirally wrapped with sound-transmission barrier tape with edges of the tape abutting.

It has also been found that neat and attractive sound-dampening hollow curved structures such as a curved conduit section or an elbow can be produced by using the high density sound-transmission barrier material 40 in tape form (see FIGS. 4 and 5). In FIG. 4 a hollow structure 12 is first covered with a spiral wrapping of the high density sound-transmission barrier tape 40 with the edges of each convolute of the tape 40 positioned adjacent to each other. The sound-transmission barrier tape 40 thus wrapped conforms to the curved outer surface 24 of the structure 12 following its curvature in a neat manner to provide a smooth covering. Positioned over the high density sound-transmission barrier material is an outer wrapping of thin flexible plastic tape 44 that is spirally wound but in an opposite direction to the first wrapping or to the spirally wound edge of the sound-barrier tape 40, so that the edge relationship between the sound-transmission barrier tape and the outer covering makes an acute angle. It will be appreciated that the two tapes 40 and 44 may be wound with any desirable angular relationship to each other provided that the tape 40 is spirally edge wrapped while the tape 44 is edge overlapped and each convolution is drawn taut during the wrapping.

Advantageously, the hollow sound-dampened structure 10 can have at least one layer of a low density sound absorption material, such as fiberglass sheeting, wrapped about the structure positioned either before or after a layer or layers of high density sound-transmission barrier material. FIG. 6 shows a cross-section of such a high frequency sound-dampened structure. The hollow sound-dampened structure has a first layer 50 wrapped about the outer surface 24 of a body portion 12. Over the first layer 50 is a second layer of high density sound-transmission barrier material 52 applied in the manner described above and as shown in FIGS. 2 and 4, and then a third layer of spirally wrapped thin flexible plastic tape as described above and shown in FIGS. 3 and 5.

It will be appreciated that the positioning of the layers of low density sound absorptive material may be before the high density sound-transmission barrier material or after it and that more than one layer or covering can be applied before the spiral wrapping of the thin flexible plastic tape is assembled to form a composite, tight fitting high frequency sound wave barrier about the outer surface of the body portion 12.

It has been found that a suitable high density sound-transmission barrier material must have a solids content sufficient to give it a load rating of about one pound per square foot and be loaded particularly with dense solids material such as inorganic solids. Any wrap type of material that has a high density and compactness of the solids content of the wrap can be used that is high in weight per square foot while maintaining a flexibleness in the wrap so that it can be easily conformed to the surface to which it is to be applied. Loading solids may be lead, barium sulfate, iron and other similar heavy solids particles.

A vinyl tape having a high load density, that is sufficient solids particles mixed in a plastic matrix so that it is an effective sound-transmission barrier for dampening sound waves from about 500 Hz and higher, can be used. For spiral wrapping of plastic tape, a tape from about 1½ inches to about 3 inches in width can be used effectively. It will be appreciated, however, that for large size hollow structures, such as circular piping of large diameter, the width of the wrapping material can be increased.

In like manner, the outer wrapping of the thin flexible plastic material can be any plastic material that is strong and durable. It has been found that a polyvinyl fluoride tape of plastic, such as du Pont "TEDLAR," produces a good overwrap that will withstand abrasive use and is particularly adaptable to being cleaned because of its tough smooth surface. It also possesses the physical ability to resist ultraviolet light. The overwrapping of material can be from about 0.001 inch to about 0.010 inch in thickness; and depending on the size of the hollow structure about which the tape is to be wrapped, the tape can have a width of from about 1½ inches to about 10 inches. Also, it is preferable that the outer wrapping be a heat-shrinkable plastic material since in high velocity transportation of flowable material considerable heat is generated, which heat is transferred through the wall of the structure thus drawing the spiral outer wrapping more tightly about the sound-transmission barrier material producing a solid wrapping that is very conducive to deadening the high frequency sound waves emanating from the hollow structure.

The low density sound absorbent material can be any type of material having a low weight per square foot, that is it must not be densely compacted. For example, woven fiberglass cloth, cellular plastic materials such as foam products, and the like may be used.

A sound-dampened hollow structure 10 can be formed by applying a thin line of adhesive to the top of the hollow body 12, such as a circular conduit, and then applying a piece of high density sound-transmission barrier material 26. The sound-transmission barrier material is cut with its width being equal to the outside diameter of the conduit so that, upon wrapping the material around the conduit, the opposite edges widthwise form a butt joint 28 and are secured to the structure by the adhesive. Over the high density sound-transmission barrier material is spirally wrapped a thin flexible plastic tape 30 with the edges 32 overlapping half the width of the tape and the tape pulled taut to the point of stretching after each convolution is made during the wrapping process until the structure is completely overwrapped.

Where bends are encountered in the formation of a sound-dampened hollow structure, the high density sound-transmission barrier material 40 is spirally applied in tape form with the tape edges 42 abutted and the tape pulled taut. The overwrapped thin flexible plastic tape 40 is applied as described above with the end of the tape adhesively attached at the finish of the overlapping process.

It will be appreciated that various changes and/or modifications may be made within the skill of the art without departing from the spirit and scope of the invention illustrated, described, and claimed herein.

What is claimed is:

1. A hollow sound-dampened structure for reducing propagation of high frequency sound waves through its wall of at least 500 Hz when fluent material is flowing in said structure, comprising a hollow walled body, a covering of a high frequency sound-transmission barrier material loaded with solids to produce a material having at least one pound per square foot total weight, said sound-transmission barrier material surrounding the outer surface of said walled body and positioned adjacent to it, and a spiral outer wrapping of thin flexible plastic material covering said sound-transmission barrier material and maintaining it firmly about said body, whereby high frequency sound waves of at least 500 Hz produced by high velocity flow of fluent material in said hollow body are dampened.

2. The hollow sound-dampened structure of claim 1 in which said structure is an elongated conduit adapted to convey fluent material therethrough.

3. The hollow sound-dampened structure of claim 1 in which said structure is a vessel adapted to process fluent material therein.

4. The hollow sound-dampened structure of claim 1 in which said elongated structure is circular in cross-section and has a curved axis in the elongated direction and said sound-transmission barrier material is spirally wrapped about said hollow body, the edges of said sound-transmission barrier material being in abutting relationship.

5. The hollow sound-dampened structure of claim 1 in which at least one additional wrapping of a sound frequency reduction material is positioned between said outer wrapping of said thin flexible plastic material and said hollow body.

6. The hollow sound-dampened structure of claim 5 in which the said one additional wrapping is a sound absorption material.

7. The hollow sound-dampened structure of claim 5 in which the said one additional wrapping is fiberglass.

8. The hollow sound-dampened structure of claim 1 in which said outer wrapping is thin flexible plastic tape that is spirally wound about said sound-transmission barrier material with the edges of the tape overlapped.

9. The hollow sound-dampened structure of claim 1 in which said outer wrapping is a heat-shrinkable plastic material.

10. The hollow sound-dampened structure of claim 9 in which said heat-shrinkable plastic material comprises polyvinyl fluoride.

11. The hollow sound-dampened structure of claim 1 in which said sound-transmission barrier material is from about 1/16 inch to about 3/16 inch in thickness.

12. The hollow sound-dampened structure of claim 1 in which said sound-transmission barrier material is a vinyl type plastic loaded with inorganic solids.

13. The hollow sound dampened structure of claim 1 in which said thin flexible plastic material is from about 1 mil to about 10 mils in thickness.

14. A method of dampening high frequency sound wave transmission of at least 500 Hz produced from high velocity flow in hollow structures, comprising covering said structure with a spiral wrapping of a high frequency sound-transmission barrier material loaded with solids to produce a material having at least one pound per square foot total weight, spirally overwrapping said sound-transmission barrier material with a wrapping of a thin flexible plastic tape material, edge overlapping said plastic tape material during wrapping to produce a spiral wrapping in which the edge of one convolution of the spiral wrapping is positioned over the edge of an adjacent convolution, and pulling said flexible plastic tape taut during wrapping of each convolution.

15. The method of claim 14 in which said thin flexible plastic tape material is heat shrinkable so as to tighten about the outer surface of the hollow structure as heat is produced by friction of the high velocity flow in the hollow structure.

16. The method of claim 14 in which said thin flexible plastic tape material comprises polyvinyl fluoride.

17. The method of claim 14 in which at least one additional wrapping of a sound frequency reduction material is positioned between said outer wrapping of thin plastic tape material and said structure.

* * * * *